United States Patent
Shirakami

(10) Patent No.: US 10,940,720 B2
(45) Date of Patent: Mar. 9, 2021

(54) TIRE FOR MOTORCYCLES

(71) Applicant: Sumitomo Rubber Industries, Ltd., Kobe (JP)

(72) Inventor: Kazuya Shirakami, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 274 days.

(21) Appl. No.: 15/818,088

(22) Filed: Nov. 20, 2017

(65) Prior Publication Data

US 2018/0162169 A1 Jun. 14, 2018

(30) Foreign Application Priority Data

Dec. 9, 2016 (JP) .............................. JP2016-239664

(51) Int. Cl.
| | | |
|---|---|---|
| *B60C 9/28* | (2006.01) | |
| *B60C 15/00* | (2006.01) | |
| *B60C 9/02* | (2006.01) | |
| *B60C 3/04* | (2006.01) | |
| *B60C 11/00* | (2006.01) | |

(52) U.S. Cl.
CPC .................. *B60C 9/28* (2013.01); *B60C 3/04* (2013.01); *B60C 9/0292* (2013.01); *B60C 11/0008* (2013.01); *B60C 15/0036* (2013.01); *B60C 15/0045* (2013.01); *B60C 2009/283* (2013.01); *B60C 2011/0033* (2013.01); *B60C 2200/10* (2013.01)

(58) Field of Classification Search
CPC ........... B60C 9/28; B60C 15/036; B60C 3/04; B60C 2009/283; B60C 2011/0033; B60C 2200/10; B60C 9/0292; B60C 15/0045; B60C 3/06
See application file for complete search history.

(56) References Cited

U.S. PATENT DOCUMENTS

| | | | | |
|---|---|---|---|---|
| 2013/0213545 A1* | 8/2013 | Tanaka | ...................... | B60C 3/04 152/454 |
| 2014/0190607 A1* | 7/2014 | Matsunami | ........... | B60C 11/032 152/209.11 |
| 2014/0202605 A1* | 7/2014 | Saiwaki | ............... | B60C 11/005 152/209.5 |

(Continued)

FOREIGN PATENT DOCUMENTS

| | | |
|---|---|---|
| EP | 0463875 A2 | 1/1992 |
| EP | 0565339 A1 | 10/1993 |

(Continued)

OTHER PUBLICATIONS

Translation of Nakagawa, JP-H0976708. (Year: 1997).*
Extended European Search Report, dated Mar. 14, 2018, for European Application No. 17203828.3.

*Primary Examiner* — Jacob T Minskey
*Assistant Examiner* — Adrien J Bernard
(74) *Attorney, Agent, or Firm* — Birch, Stewart, Kolasch & Birch, LLP

(57) ABSTRACT

A tire 1 for motorcycles comprises a carcass 6, a belt layer 7, and a tread rubber 2G. The belt layer 7 includes at least one reinforcing cord coated with rubber and spirally wound. In a meridian section passing through a tire rotational axis of the tire 1 in a standard state, a width BW of the belt layer 7 in a tire axial direction is in a range of from 60% to 80% of a tread width TW. The tread rubber 2G has a thickness at a tire equator (C) in a range of from 70% to 90% of thickness at tread edges (2t).

20 Claims, 1 Drawing Sheet

(56) References Cited

U.S. PATENT DOCUMENTS

2017/0136822 A1* 5/2017 Takita ................. B60C 9/30
2019/0255885 A1* 8/2019 Muramatsu ............ B60C 3/04

FOREIGN PATENT DOCUMENTS

| JP | 9-76708 A | | 3/1997 | |
|----|-----------|---|--------|---------|
| JP | H0976708 | * | 3/1997 | ............ B60C 9/02 |
| JP | 2008-162355 A | | 7/2008 | |

* cited by examiner

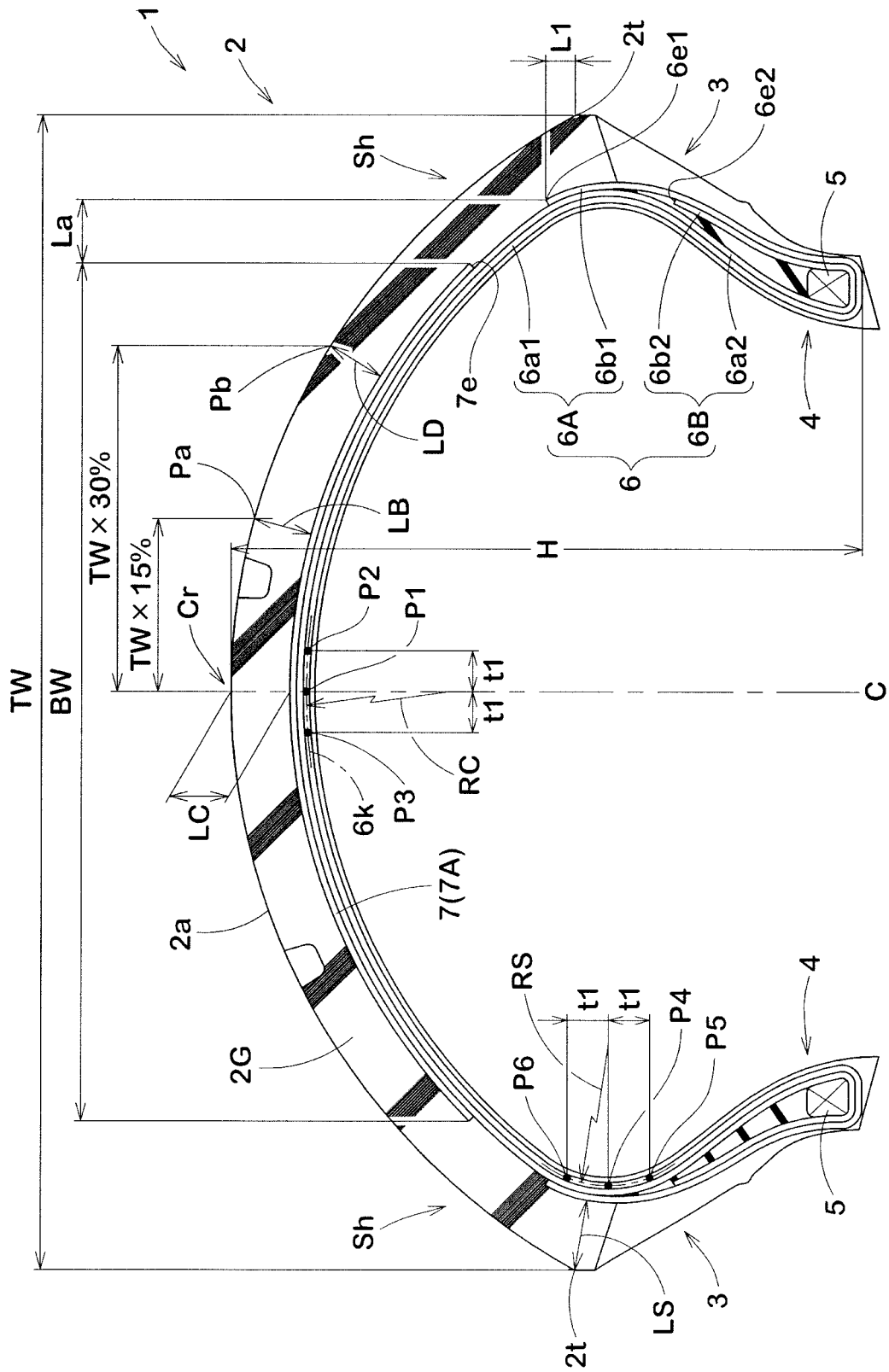

TIRE FOR MOTORCYCLES

TECHNICAL FIELD

The present invention relates to a tire for motorcycles having improved steering stability.

BACKGROUND ART

In recent years, in order to improve the steering stability of a tire for motorcycles, there has been a demand for improving the following characteristics in a good balance: cornering performance, which is the steering stability at the end of cornering, the stability of rolling speed from straight running to the end of cornering, and handling performance (hereinafter may be simply referred to as "transient characteristics") which is evaluated in terms of linearity of change of ground contacting feeling accompanying an increase in a camber angle from straight running to the end of cornering.

In order to improve the transient characteristics, it is required to decrease change in compression rigidity of a tread portion from a crown region including a tire equator to shoulder regions including tread edges. Further, in order to improve the cornering performance, it is required to maintain the compression rigidity of the shoulder regions at a high level. However, if the compression rigidity of the shoulder regions is excessively high, ground contacting areas of the shoulder regions become small, therefore, the cornering performance is deteriorated.

SUMMARY OF THE INVENTION

The present invention was made in view of the above, and a primary object thereof is to provide a tire for motorcycles having improved steering stability by improving a width of a belt layer and a thickness of a tread rubber.

In one aspect of the present invention, a tire comprises a carcass extending between bead cores of bead portions via a tread portion and sidewall portions, a belt layer arranged outside the carcass in a tire radial direction in the tread portion, and a tread rubber arranged radially outside the belt layer, the belt layer including at least one reinforcing cord coated with rubber and spirally wound, wherein in a meridian section passing through a tire rotational axis of the tire in a standard state in which the tire is mounted on a standard rim, inflated to a standard pressure, and loaded with no tire load, a width BW of the belt layer in a tire axial direction is in a range of from 60% to 80% of a tread width TW, and the tread rubber has a thickness at a tire equator in a range of from 70% to 90% of thickness at tread edges.

In another aspect of the invention, it is preferred that the carcass comprises at least one carcass ply comprising a main body extending between the bead cores of the bead portions and turned up portions extending from both ends of the main body and each turned up around respective bead core, a main body profile, which is a profile of the main body in the tread portion in the meridian section, satisfies the following expression (1):

$$1.5 \leq RC/RS \leq 7.0 \quad (1)$$

wherein the RC is a radius of curvature of an arc passing through a first point which is a position of the main body profile at the tire equator, and a second point and a third point which are positions of the main body profile apart from the first point on both sides thereof in the tire axial direction each by a distance of 2.5% of the tread width TW, and the RS is a radius of curvature of an arc passing through a fourth point which is an axially outermost position of the main body profile and a fifth point and a sixth point which are positions of the main body profile apart from the fourth point on both sides thereof in the tire radial direction each by a distance of 2.5% of the tread width TW.

In another aspect of the invention, it is preferred that each of radially outer ends of the turned up portions is positioned radially outside the tread edges respectively.

BRIEF DESCRIPTION OF THE DRAWINGS

FIG. 1 is a meridian section of a tire for motorcycles according to an embodiment of the present invention.

DESCRIPTION OF THE PREFERRED EMBODIMENT

An embodiment of the present invention will now be described in conjunction with accompanying drawings.

FIG. 1 is a meridian cross-section of a tire for motorcycles (hereinafter may be simply referred to as "tire") 1 in this embodiment passing through a tire rotational axis (not shown) thereof in a standard state. The present invention can be applied to a tire 1 suitable for running on a paved road, for example.

The "standard state" is a state in which the tire is mounted on a standard rim, inflated to a standard pressure, and loaded with no tire load. In this specification, dimensions and the like of various parts of the tire are those of the tire measured in the standard state unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

In the tire 1 in this embodiment, a tread ground contacting surface (2a) of a tread portion 2 between tread edges (2t) extends in an arc shape convex toward outside in a tire radial direction so that sufficient ground contacting area can be obtained even during cornering when the camber angle is large. A distance between the tread edges (2t) in a tire axial direction is a tread width TW, which is a maximum width of the tire.

The tread ground contacting surface (2a) includes a crown region (Cr) including a tire equator (C) and shoulder regions (Sh) on both sides of the crown region (Cr) and each on a side of respective one of the tread edges (2t). The crown region (Cr) in this embodiment is a region which is in contact with a flat surface when the tire 1 in the standard state is in contact with the flat surface with zero camber angle by being loaded with a standard tire load. The shoulder regions (Sh) in this embodiment are regions which include the tread edges (2t) and are in contact with a flat surface when the motorcycle is tilted on the flat surface during cornering.

The tire 1 includes the tread portion 2, a pair of sidewall portions 3 extending radially inwardly from both ends in the tire axial direction of the tread portion 2, and bead portions 4 disposed at radially inner ends of the sidewall portions 3, respectively, to be mounted on a rim (not shown).

The tire 1 in this embodiment includes a carcass 6, a belt layer 7, and a tread rubber 2G.

The carcass 6 is formed by at least one carcass ply. The carcass 6 in this embodiment is formed by two carcass plies 6A and 6B. The carcass ply 6B is arranged radially outside the carcass ply 6A. Each of the carcass plies 6A and 6B includes carcass cords arranged at an angle in a range of from 75 to 90 degrees, for example, with respect to the tire equator (C). Organic fiber cords such as nylon, polyester, rayon or the like are suitably used for the carcass cords, for example.

The carcass plies 6A and 6B include main body portions (6a1) and (6a2), and turned up portions (6b1) and (6b2), respectively. Each of the main body portions (6a1) and (6a2) extends between bead cores 5 of the bead portions 4 via the tread portion 2 and the sidewall portions 3. Each of the turned up portions (6b1) and (6b2) extends from the main body portions (6a1) and (6a2) respectively and is turned up around respective bead cores 5 from axially inside to axially outside so as to terminate on a radially outer side of the respective bead core 5.

Outer ends (6e1) in the tire radial direction of the turned up portions (6b1) of the radially inner carcass ply 6A in this embodiment are positioned radially outside the tread edges (2t). Thereby, it is possible that rigidity of the tread edges (2t) is effectively increased.

If the outer ends (6e1) of the radially inner carcass ply 6A are positioned excessively radially outside the tread edges (2t), the compression rigidity of the shoulder regions (Sh) is increased, therefore, it is possible that the cornering performance is deteriorated. Thereby, it is preferred that a shortest distance L1 in the tire radial direction between each of the outer ends (6e1) of the radially inner carcass ply 6A and its adjacent one of the tread edges (2t) is in a range of from 3% to 8% of a tire section height (H).

Outer ends (6e2) in the tire radial direction of the turned up portion (6b2) of the radially outer carcass ply 6B in this embodiment are positioned radially inside the tread edges (2t). Thereby, excessive increase in the compression rigidity of the shoulder regions (Sh) is suppressed.

The belt layer 7 in this embodiment is arranged radially outside the radially outer carcass ply 6B and in the tread portion 2. The belt layer 7 is formed of a single layer of a jointless ply 7A formed by at least one rubber-coated reinforcing cord (not shown) spirally wound at an angle not greater than 10 degrees with respect to the tire equator (C). A steel cord or an organic cord is suitably used for the reinforcing cord, for example.

As compared with a tire having a belt layer having a reinforcing cord wound at a relatively large angle with respect to a tire circumferential direction, for example, the tire 1 having the belt layer 7 formed of the jointless ply 7A configured as such allows local deformation of the belt layer 7, therefore, it is possible that the transient characteristics are improved.

A width BW in the tire axial direction of the belt layer 7 is set to be in a range of from 60% to 80% of the tread width TW. If the width BW of the belt layer 7 is smaller than 60% of the tread width TW, change in the compression rigidity between the crown region (Cr) and the shoulder regions (Sh) becomes large, therefore, the transient characteristics are deteriorated. If the width BW of the belt layer 7 is larger than 80% of the tread width TW, the compression rigidity of the shoulder regions (Sh) becomes excessively high, therefore, the deformation of the tread portion 2 is suppressed, thus, the ground contacting area during latter period of cornering becomes small, thereby, the cornering performance is deteriorated. From this point of view, it is preferred that the width BW of the belt layer 7 is set to be in a range of from 65% to 75% of the tread width TW.

It is preferred that a length (La) in the tire axial direction between each of outer ends (7e) of the belt layer 7 and respectively adjacent one of the outer ends (6e1) of the radially inner carcass ply 6A is in a range of from 3% to 8% of the tread width TW. If the length (La) in the tire axial direction is small, it is possible that the compression rigidity of the shoulder regions (Sh) becomes excessively large. If the length (La) in the tire axial direction is large, it is possible that not only the change of the compression rigidity is increased but also the compression rigidity of the shoulder regions (Sh) is decreased.

The tread rubber 2G is arranged radially outside the belt layer 7 so as to extend between the pair of the tread edges (2t). The tread rubber 2G in this embodiment is formed of one layer of rubber arranged radially outside the belt layer 7. However, the tread rubber 2G may be formed of a plurality of layers of rubber, for example.

In the tread rubber 2G, thickness LC thereof at the tire equator (C) is set to be in a range of from 70% to 90% of thickness LS thereof at the tread edges (2t). If the thickness LC of the tread rubber 2G at the tire equator (C) is smaller than 70% of the thickness LS of the tread rubber 2G at the tread edges (2t), a change of compression rigidity from the crown region (Cr) to the shoulder regions (Sh) becomes large, therefore, the transient characteristics are deteriorated. Large lateral force is applied to the shoulder regions (Sh) during cornering, therefore, the shoulder regions (Sh) are required to have greater rigidity than the crown region (Cr). Thereby, if the thickness LC of the tread rubber 2G at the tire equator (C) is larger than 90% of the thickness LS of the tread rubber 2G at the tread edges (2t), balance of the compression rigidity between the crown region (Cr) and the shoulder regions (Sh) is deteriorated, therefore, the transient characteristics are rather deteriorated. From this point of view, it is preferred that the thickness LC of the tread rubber 2G at the tire equator (C) is set to be in a range of from 75% to 85% of the thickness LS of the tread rubber 2G at the tread edges (2t). The thickness LS of the tread rubber 2G at the tread edges (2t) is thickness thereof in normal directions of the radially outermost turned up portions of the carcass plies, the turned up portions (6b1) of the radially inner carcass ply 6A in this embodiment.

In the tread rubber 2G, it is preferred that a ratio (LB/LD) of thickness LB thereof at a crown side point (Pa) and thickness LD thereof at a shoulder side point (Pb) is larger than a ratio (LC/LS) of the thickness LS at the tread edges (2t) and the thickness LC at the tire equator (C). Thereby, it is possible that change in the compression rigidity of the tread portion 2 is further decreased, therefore, the transient characteristics are further improved. The ratio (LB/LD) is preferably not smaller than 90%, more preferably not smaller than 93%, and preferably not greater than 100%, more preferably not greater than 98%. The crown side point (Pa) is a position away from the tire equator (C) toward one of the tread edges (2t) by a distance of 15% of the tread width TW. The shoulder side point (Pb) is a position away from the tire equator (C) toward one of the tread edges (2t) by a distance of 30% of the tread width TW.

In the tire 1 in this embodiment, it is preferred that a main body profile (6k), which is a profile of the main body portion (6a1) of the radially inner carcass ply 6A in the tread portion 2, satisfies the following expression (1). Note that the main body profile (6k) is positioned on a center line of the main body portion (6a1) of the radially inner carcass ply 6A.

$$1.5 \leq RC/RS \leq 7.0 \tag{1}$$

It should be noted that the RC is a radius of curvature of an arc passing through three points of a first point P1, a second point P2, and a third point P3 (hereinafter may be simply referred to as a "tire equatorial radius of curvature"). The first point P1 is a point of the main body profile (6k) positioned at the tire equator (C). The second point P2 and the third point P3 are points of the main body profile (6k) positioned away from the first point P1 on both sides thereof in the tire axial direction each by a distance (t1) of 2.5% of the tread width TW.

Further, the RS is a radius of curvature of an arc passing through three points, a fourth point P4, a fifth point P5, and a sixth point P6 (hereinafter may be simply referred to as a "axial end radius of curvature") on each side in the tire axial direction. The fourth point P4 is a point of the main body profile (6k) positioned axially outermost. The fifth point P5 and the sixth point P6 are points of the main body profile (6k) positioned away from the fourth point P4 on both sides thereof in the tire radial direction each by the distance (t1) of 2.5% of the tread width TW.

That is, it is preferred that the tire equatorial radius of curvature RC is in a range of from 1.5 to 7.0 times the axial end radius of curvature RS. If the tire equatorial radius of curvature RC is smaller than 1.5 times the axial end radius of curvature RS, the compression rigidity of the shoulder regions (Sh) is maintained at an excessively high level, thus, deformation of the shoulder regions (Sh) is greatly suppressed, therefore, the ground contacting area thereof becomes small, thereby, it is possible that the cornering performance is deteriorated. If the tire equatorial radius of curvature RC is larger than 7.0 times the axial end radius of curvature RS, the rigidity of the shoulder regions (Sh) becomes excessively small, therefore, the change of the compression rigidity of the tread portion 2 becomes large, thereby, it is possible that the transient characteristics and the cornering performance are deteriorated.

While detailed description has been made of an especially preferred embodiment of the present invention, the present invention can be embodied in various forms without being limited to the illustrated embodiment.

Working Example (Example)

Tires for motorcycles having the basic structure shown in FIG. 1 were made by way of test according to the specifications listed in Table 1. Then the test tires were tested for the transient characteristics and the cornering performance. The common specifications of each of the test tires are as follows.

Test vehicle: a motorcycle with a displacement of 1300 cc
Tire size: 120/70ZR17 (front), 180/55ZR17 (rear)
Rim size: MT3.50×17 (front), MT5.50×17 (rear)
Tire pressure: 250 kPa (front), 290 kPa (rear)
Belt layer: having a jointless structure in which a strip of ply made by three steel cords coated with rubber and spirally wound plural times
Carcass cord: rayon
LS: same thickness among References 1 to 4 and Examples 1 to 11
Test methods are as follows.

<Transient Characteristics and Cornering Performance>

Each of the test tires was mounted on the test vehicle and a test driver drove the test vehicle on a dry asphalt road surface of a test course, then the transient characteristics and the cornering performance were evaluated during the test drive by the driver's feeling. The results are indicated by an evaluation point based on Reference 1 being 100, wherein the larger the numerical value, the better the steering stability is. The results are shown in Table 1.

TABLE 1

|  |  | Ref. 1 | Ex. 1 | Ex. 2 | Ex. 3 | Ref. 2 | Ref. 3 | Ex. 4 | Ex. 5 | Ref. 4 | Ex. 6 | Ex. 7 |
|---|---|---|---|---|---|---|---|---|---|---|---|---|
| BW/TW | [%] | 50 | 60 | 70 | 80 | 90 | 70 | 70 | 70 | 70 | 70 | 70 |
| LC/LS | [%] | 80 | 80 | 80 | 80 | 80 | 60 | 70 | 90 | 95 | 80 | 80 |
| RC/RS |  | 5.8 | 5.8 | 5.8 | 5.8 | 5.8 | 5.8 | 5.8 | 5.8 | 5.8 | 1.2 | 1.5 |
| La/TW | [%] | 5 | 5 | 5 | 5 | 5 | 5 | 5 | 5 | 5 | 5 | 5 |
| LB/LD | [%] | 100 | 100 | 100 | 100 | 100 | 100 | 100 | 100 | 100 | 100 | 100 |
| Cornering performance [evaluation point: larger is better] |  | 100 | 115 | 125 | 120 | 105 | 105 | 116 | 118 | 100 | 115 | 120 |
| Transient characteristics [evaluation point: larger is better] |  | 100 | 108 | 110 | 104 | 100 | 100 | 107 | 106 | 105 | 102 | 104 |

|  |  | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|
| BW/TW | [%] | 70 | 70 | 60 | 60 | 60 | 60 | 70 | 70 | 70 | 70 |
| LC/LS | [%] | 80 | 80 | 80 | 80 | 80 | 80 | 80 | 80 | 80 | 80 |
| RC/RS |  | 7.0 | 7.5 | 5.8 | 5.8 | 5.8 | 5.8 | 5.8 | 5.8 | 5.8 | 5.8 |
| La/TW | [%] | 5 | 5 | 2 | 3 | 8 | 10 | 5 | 5 | 5 | 5 |
| LB/LD | [%] | 100 | 100 | 100 | 100 | 100 | 100 | 85 | 90 | 98 | 105 |
| Cornering performance [evaluation point: larger is better] |  | 115 | 110 | 113 | 114 | 113 | 112 | 120 | 123 | 125 | 118 |
| Transient characteristics [evaluation point: larger is better] |  | 110 | 110 | 104 | 106 | 107 | 105 | 107 | 110 | 112 | 105 |

From the test results, it was confirmed that the tires as the examples had high steering stability.

The invention claimed is:

1. A tire for motorcycles comprising:
    a carcass extending between bead cores of bead portions via a tread portion and sidewall portions,
    a belt layer arranged outside the carcass in a tire radial direction in the tread portion so as to be in direct contact with the carcass such that no other belt layer exists between the carcass and the belt layer, and
    a tread rubber arranged radially outside the belt layer,
    the belt layer including at least one reinforcing cord coated with rubber and spirally wound at an angle not greater than 10 degrees with respect to the tire equator, wherein
    in a meridian section passing through a tire rotational axis of the tire in a standard state in which the tire is mounted on a standard rim, inflated to a standard pressure, and loaded with no tire load,
    a width BW of the belt layer in a tire axial direction is in a range of from 60% to 80% of a tread width TW,
    the tread rubber has a thickness at a tire equator in a range of from 70% to 90% of thickness at tread edges, and,
    the tread width is a distance between the tread edges in a tire axial direction and is the maximum width of the tire.

2. The tire according to claim 1, wherein
    the carcass comprises at least one carcass ply comprising a main body extending between the bead cores of the bead portions and turned up portions extending from both ends of the main body and each turned up around respective bead core,
    a main body profile, which is a profile of the main body in the tread portion in the meridian section, satisfies the following expression (1):

$$1.5 \leq RC/RS \leq 7.0 \tag{1}$$

wherein
    RC is a radius of curvature of an arc passing through a first point which is a position of the main body profile at the tire equator, and a second point and a third point which are positions of the main body profile apart from the first point on both sides thereof in the tire axial direction each by a distance of 2.5% of the tread width TW, and
    RS is a radius of curvature of an arc passing through a fourth point which is an axially outermost position of the main body profile and a fifth point and a sixth point which are positions of the main body profile apart from the fourth point on both sides thereof in the tire radial direction each by a distance of 2.5% of the tread width TW.

3. The tire for motorcycles according to claim 2, wherein each of radially outer ends of the turned up portions is positioned radially outside the tread edges respectively.

4. The tire according to claim 1, wherein
    the carcass includes at least one carcass ply, and
    a length in the tire axial direction between an outer end of the belt layer and an outer end of the carcass ply adjacent to the outer end of the belt layer is in a range of from 3% to 8% of the tread width TW.

5. The tire according to claim 1, wherein
    the carcass includes at least one carcass ply, and
    a shortest distance in the tire radial direction between an outer end of the carcass ply and the tread edge adjacent to the outer end of the carcass ply is in a range of from 3% to 8% of a tire section height, the tire section height being the tire radial height from the tire bead base line to the tire equator.

6. The tire according to claim 1, wherein
    the carcass includes two carcass plies, one overlying on the other in the tire radial direction,
    each of the carcass plies includes a main body extending between the bead cores of the bead portions and turned up portions extending from both ends of the main body and each turned up around respective bead core, and
    outer ends in the tire radial direction of the turned up portions of the radially outer carcass ply are positioned radially inside the tread edges.

7. The tire according to claim 1, wherein a thickness of the tread rubber at the tire equator is in a range of from 75% to 85% of the thickness of the tread rubber at the tread edges.

8. The tire according to claim 1, wherein
    a ratio (LB/LD) of a thickness LB of the tread rubber at a crown side point and a thickness LD of the tread rubber at a shoulder side point is not smaller than 90% and not greater than 100%,
    the crown side point is a position away from the tire equator toward one of the tread edges by a distance of 15% of the tread width TW, and
    the shoulder side point is a position away from the tire equator toward one of the tread edges by a distance of 30% of the tread width TW.

9. The tire according to claim 8, wherein the ratio (LB/LD) of the thickness LB of the tread rubber at the crown side point and the thickness LD of the tread rubber at the shoulder side point is not smaller than 93% and not greater than 98%.

10. The tire according to claim 2, wherein the main body profile satisfies the following expression (2):

$$5.8 \leq RC/RS \leq 7.0 \tag{2}$$

11. A tire for motorcycles comprising:
    a carcass extending between bead cores of bead portions via a tread portion and sidewall portions,
    a belt layer arranged outside the carcass in a tire radial direction in the tread portion so as to be in direct contact with the carcass, and
    a tread rubber arranged radially outside the belt layer,
    the belt layer including at least one reinforcing cord coated with rubber and spirally wound,
    wherein
    in a meridian section passing through a tire rotational axis of the tire in a standard state in which the tire is mounted on a standard rim, inflated to a standard pressure, and loaded with no tire load,
    a width BW of the belt layer in a tire axial direction is in a range of from 60% to 80% of a tread width TW,
    the tread rubber has a thickness at a tire equator in a range of from 70% to 90% of thickness at tread edges,
    the tread width is a distance between the tread edges in a tire axial direction and is the maximum width of the tire,
    the carcass comprises at least one carcass ply comprising a main body extending between the bead cores of the bead portions and turned up portions extending from both ends of the main body and each turned up around respective bead core,
    a main body profile, which is a profile of the main body in the tread portion in the meridian section, satisfies the following expression (2):

$$5.8 \leq RC/RS \leq 7.0 \tag{2}$$

wherein
- RC is a radius of curvature of an arc passing through a first point which is a position of the main body profile at the tire equator, and a second point and a third point which are positions of the main body profile apart from the first point on both sides thereof in the tire axial direction each by a distance of 2.5% of the tread width TW, and
- RS is a radius of curvature of an arc passing through a fourth point which is an axially outermost position of the main body profile and a fifth point and a sixth point which are positions of the main body profile apart from the fourth point on both sides thereof in the tire radial direction each by a distance of 2.5% of the tread width TW.

12. The tire for motorcycles according to claim 11, wherein each of radially outer ends of the turned up portions is positioned radially outside the tread edges respectively.

13. The tire for motorcycles according to claim 11, wherein, in the meridian section, a width BW of the belt layer in a tire axial direction is in a range of from 60% to 75% of a tread width TW.

14. The tire for motorcycles according to claim 11, wherein
- the carcass includes at least one carcass ply, and
- a length in the tire axial direction between an outer end of the belt layer and an outer end of the carcass ply adjacent to the outer end of the belt layer is in a range of from 3% to 8% of the tread width TW.

15. The tire for motorcycles according to claim 11, wherein
- the carcass includes at least one carcass ply, and
- a shortest distance in the tire radial direction between an outer end of the carcass ply and the tread edge adjacent to the outer end of the carcass ply is in a range of from 3% to 8% of a tire section height, the tire section height being the tire radial height from the tire bead base line to the tire equator.

16. The tire for motorcycles according to claim 11, wherein
- the carcass includes at least one carcass ply,
- the carcass ply includes carcass cords arranged at an angle in a range of from 75 to 90 degrees with respect to the tire equator, and
- the belt layer is formed by at least one rubber-coated reinforcing cord spirally wound at an angle not greater than 10 degrees with respect to the tire equator.

17. The tire for motorcycles according to claim 11, wherein
- the carcass includes two carcass plies, one overlying on the other in the tire radial direction,
- each of the carcass plies includes a main body extending between the bead cores of the bead portions and turned up portions extending from both ends of the main body and each turned up around respective bead core, and
- outer ends in the tire radial direction of the turned up portions of the radially outer carcass ply are positioned radially inside the tread edges.

18. The tire for motorcycles according to claim 11, wherein a thickness of the tread rubber at the tire equator is in a range of from 75% to 85% of the thickness of the tread rubber at the tread edges.

19. The tire for motorcycles according to claim 11, wherein
- a ratio (LB/LD) of a thickness LB of the tread rubber at a crown side point and a thickness LD of the tread rubber at a shoulder side point is not smaller than 90% and not greater than 100%,
- the crown side point is a position away from the tire equator toward one of the tread edges by a distance of 15% of the tread width TW, and
- the shoulder side point is a position away from the tire equator toward one of the tread edges by a distance of 30% of the tread width TW.

20. The tire for motorcycles according to claim 19, wherein the ratio (LB/LD) is not smaller than 93% and not greater than 98%.

* * * * *